United States Patent
Buzzelli

[15] 3,650,834
[45] Mar. 21, 1972

[54] ALUMINUM BROMIDE FUSED SALT BATTERY

[72] Inventor: Edward S. Buzzelli, Solon, Ohio
[73] Assignee: The Standard Oil Company, Cleveland, Ohio
[22] Filed: Jan. 28, 1970
[21] Appl. No.: 6,410

[52] U.S. Cl. .................................136/22, 136/83, 136/153
[51] Int. Cl. ..........................................H01m 35/02
[58] Field of Search .............................136/22, 6, 83, 153, 20

[56] References Cited

UNITED STATES PATENTS

| | | | |
|---|---|---|---|
| 2,924,634 | 2/1960 | Fischbach et al. | 136/86 |
| 3,447,968 | 6/1969 | Rightmire | 136/22 |
| 3,462,313 | 8/1969 | Rightmire et al. | 136/83 |

OTHER PUBLICATIONS

Evaluation of New Cathode–Anode Couples for Secondary Batteries, ASD–TDR–62–4, Technical Documentary Report, Apr. 1962, pp. 1, 24, 30.

*Primary Examiner*—Winston A. Douglas
*Assistant Examiner*—C. F. LeFevour
*Attorney*—John F. Jones and Sherman J. Kemmer

[57] ABSTRACT

The secondary electrical energy storage battery of this invention comprises a carbon cathode, an aluminum metal anode, and a fused salt electrolyte containing an aluminum halide in admixture with one or more of the halides of the alkali metals. The electrical energy storage device described has the advantage of being operable in a lower temperature range than presently known fused salt batteries.

8 Claims, 1 Drawing Figure

Patented March 21, 1972
3,650,834
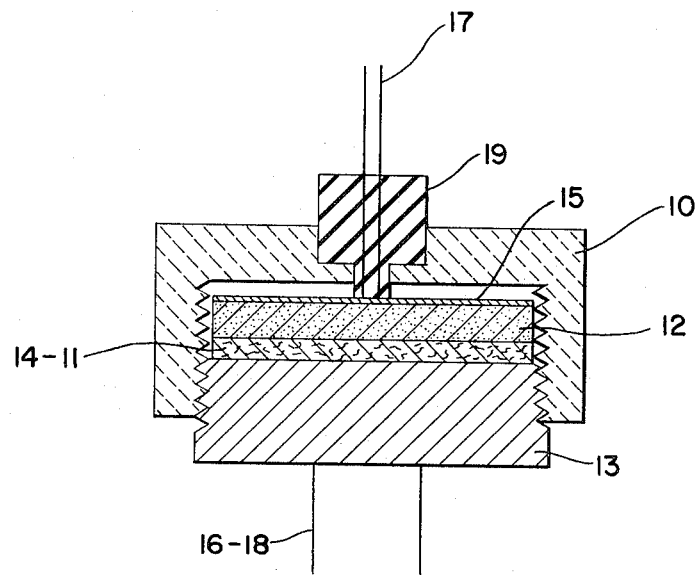
INVENTOR.
EDWARD S. BUZZELLI
BY
*John F. Jones*
ATTORNEY

ALUMINUM BROMIDE FUSED SALT BATTERY

This invention relates to an electrical energy storage device, and more particularly to a secondary electrical energy storage battery containing a fused salt electrolyte. The energy storage system of this invention comprises a carbon cathode, an aluminum metal anode, and an aluminum halide-containing electrolyte. The electrical energy storage device described herein has the advantage of being operable in a lower temperature range than known fused salt batteries of the prior art, thereby avoiding many of the difficulties associated with high temperature batteries such as corrosion, sealing problems and leakage. The energy storage device of this invention is operable in the temperature range of about 50° to 250° C. and can be readily assembled as a portable rechargeable unit.

Heretofore, the use of aluminum halides as electrolytes in electrical energy storage cells has received little consideration because of their chemical and thermal instability. However, aluminum halides in admixture with other ionic salts such as alkali metal halides have greater electrical conductivity, higher sublimation temperatures, and lower melting points than the aluminum halides themselves. The composition of the electrolyte contemplated in this system comprises aluminum chloride or aluminum bromide in combination with one or more of the halides of the alkali metals. Both binary and ternary electrolyte systems are operable, such as for example, the combinations of lithium chloride-aluminum chloride, sodium chloride-potassium chloride-aluminum chloride, lithium chloride-potassium chloride-aluminum chloride and aluminum bromide-aluminum chloride-lithium chloride. The ratio of alkali metal halides to aluminum halide in the electrolyte may be in the range of 20 to 80 parts by weight of the alkali metal halides to 80 to 20 parts by weight of aluminum halide.

The electrolyte systems described in this invention provide a source of mobile ions in the molten state in the temperature range of 50° to 250° C. The upper temperature limit at which the cell is operable is governed by the sublimation temperature of the aluminum halide. When heated above their melting points, the crystalline compounds or mixtures thereof are dissolved in each other and each of the components of the crystalline material provides mobile ions.

The cathode in the electrical energy storage device of this invention may be composed of porous carbon or graphite. Both carbon and graphite function in a reversible manner, and their performance is essentially equivalent. However, the carbon and graphite electrodes are believed to store energy by different electrochemical mechanisms. For example, the energy storage device containing a porous carbon electrode develops a storage capacity by building up a charge at the electrode-electrolyte interface by a mechanism similar to that of a chlorine energy storage cell. The greater the interface area, the greater the energy storage capacity of the device. Therefore, it is essential that the electrolyte encase substantially the entire geometric surface area of the electrode and impregnate it.

Graphite, on the other hand, because of its crystallinity appears to form intercalation compounds with the aluminum halide of the electrolyte as evidenced by an increase in size of the electrode in the direction of the plane of the carbon crystal and by a blue coloration that develops in the electrode during alternate charging in the positive and negative directions. The blue coloration is believed to be associated with the formation of an $AlCl_3 \cdot 9C$ complex.

The porous carbon employed in the preparation of the cathode of the present invention should have a surface area in the range of 10–2,000 meters$^2$/gram and preferably in the range of 100–1,500 meters$^2$/gram as measured by the Brunhauer-Emmett-Teller method. Activated carbons may also be utilized. The surface area in these activated carbons is mainly internal, and it is essential that the pores in the carbon material be sufficiently large to permit electrolyte penetration. Active carbon may be generated by numerous known activation methods. The initial stage in the preparation of an active carbon is carbonization or charring of the raw material, usually in the absence of air below 600° C. Most carbon-containing substances can be charred. After the source material is charred, the char is activated. The method used most extensively to increase the activity of carbonized material is controlled oxidation of a char by suitable oxidizing gases at elevated temperatures. Most of the present commercial processes involve steam or carbon dioxide activation between 800° and 1,000° C. or air oxidation between 300° and 600° C. Alternately, gases such as chlorine, sulfur dioxide and phosphorous may also be used. The carbon employed in the present invention can be derived from such material as activated petroleum coke, wood char, activated sodium lignosulfonate char, activated bituminous coal, polyvinylidene chloride char, polyacrylonitrile char and the like.

If graphite is employed as a material for cathode fabrication, it is preferred to use a dense, non-porous oriented form such as pyrolytic graphite.

The cathode may be fabricated in the form of plates, foils or compacting powders and may vary in thickness from 0.005 inch to about 0.5 inch. The performance of the porous carbon does not appear to be thickness-dependent, while a graphite cathode appears to exhibit better performance as a thin electrode in the range of from about 0.01 to 0.02 inch in thickness.

It is preferred that the carbon cathode be preconditioned before use in the electrochemical cell. Preconditioning can be carried out by cycling the electrode both in the positive direction and the negative directions while in contact with the fused electrolyte. This treatment results in the removal of easily degradable impurities from the carbon, such as oxygen and ash, and the permeation of the electrode with the electrolyte. Preconditioning may be carried out by charging the carbon to at least 0 volt with respect to chlorine evolution or to a point at which the halogen evolution becomes prohibitive, and then in a negative direction to at least −2.2 volts with respect to chlorine evolution.

The anode may comprise pure aluminum metal. However, certain metallic impurities as for example silicon, indium, magnesium, copper, iron, and manganese may be tolerated in concentrations of up to 10 percent by weight. In the electrolysis reaction taking place in the cell, aluminum metal from the electrolyte is deposited on the anode. However, the alkali metal may also be co-deposited with the aluminum, and in some instances the rate of transport of alkali metal may exceed that of aluminum. There is some evidence that the deposit of alkali metal entering the anode may increase the cell potential at which the cell is operable above the level imposed by the decomposition potential of the electrolyte. However, it is generally preferred the cell described herein be operated at a level not to exceed the decomposition potential of the electrolyte of the system i.e., preferably below about 2.2 volts.

The carbon electrode in this system has a gradient discharge curve sloping downwardly. The discharge curve can be altered and the capacity for storing electrical energy can be increased considerably by incorporating certain metallic additives directly into the electrolyte or directly into the carbon electrode of the system. These additives comprise compounds of tellurium and tungsten. By applying a cyclic charge and discharge to the system, these metals become permanently bonded to the carbon of the cathode forming an active metal-carbon species. The formation of the active metal-carbon species is characterized by a reaction plateau appearing at certain levels in the discharge curve of the electrode. For example, for the tellurium additive the reaction plateau appears at a potential of from about 1.3 to 2.2 volts.

The desired metal additive may be added to the system as any compound that is soluble in the electrolyte, stable in the environment of the cell and is compatible with the ions of the system so that metals foreign to the system will neither contaminate nor plate out on the surface of the metallic anode. The preferred compounds are those containing cations or anions that are already present in the system. Those compounds suitable for the purpose of addition include tellurium metal, tellurous and telluric halides, oxides, and acids, the tellurides and the tellurate and tellurite salts of the alkali and alkaline earth metals, tungsten metal, tungsten chlorides, and tungsten oxides. Those compounds particularly suitable are the tellurium halides and the tellurates, tellurites and tellurides of lithium and potassium.

With the use of the metal additives of tellurium and tungsten in the system, silicon carbide and boron carbide may be utilized as cathode compositions in addition to porous carbon and graphite. Composite cathode compositions may include, for example, tellurium-silicon carbide, tungsten-silicon boride, etc.

The metal additives may be incorporated into the carbon electrode by adding the desired compound of the metal to the carbon powder during the manufacture of the electrode. By adding the metal compound directly to the carbon prior to the molding step, a shorter preconditioning cycle is required to convert the metal to the active form than is required when the metal is added to the electrolyte. Tellurium, or tungsten may be introduced into the electrode by mixing the desired compound with carbon powder in the desired proportions with or without a binder. The electrode is then molded into the proper geometric form usually under pressure.

The amounts of these metals required in the system to being about a discernible enhancement in energy storage capacity is more dependent upon the design of the cell and the rate of reaction in forming the active metal-carbon complex, than by the rate of diffusion of the metal into the cathode. Sufficient amounts of the desired metal should be present in the system to drive the reaction forming the active metal-carbon species to completion. However, not so great an excess of metal should be present so as to cause excessive leakage current. Tellurium or tungsten may be added to the electrolyte or to the carbon electrode in amounts such that the conditioned cathode contains from 5 to 40 percent by weight, and preferably from 10 to 35 percent by weight of the metal, based on the weight of carbon.

A more complete disclosure of the tellurium additive and its use in a molten salt energy storage cell is given in copending U.S. Pat. application Ser. No. 808,876 by R. A. Rightmire, J. L. Benak, and J. E. Metcalfe, filed Mar. 20, 1969.

In the assembly of the cell, it is preferred that an ion-permeable electron-insulating separator be disposed between and separating the electrodes. The separator should have insulating properties to prevent short-circuiting, and it is essential that it be porous, chemically inert, insoluble, and thermally stable under operating conditions of the cell. With the use of a separator, any possible self-discharge short-circuiting between the electrodes caused by distortion or buckling of the electrodes is lessened and inner electrode distances and liquid volumes are minimized. Because of the lower operating temperature of the cell, a wider variety of materials may be used as separators. Suitable materials include boron nitride felt, ceramic fiber made from alumina and silica, Teflon, semipermeable polycarbonate membrane and the like.

In the operation of the device described, the cell is charged by applying an electrical potential less than the decomposition potential of the medium across the conducting plates until the device is charged to its full capacity. The electrical energy thus stored may be selectively discharged through any suitable load. Suitable heating means are provided for raising and maintaining the temperature of the electrolyte to the fusion point of the medium.

The electrical energy storage units herein described lend themselves to connection with units of similar construction either by a connection of a number of units in series and parallel or by utilization of a stack of electrodes.

A greater understanding of the invention described herein may be obtained by referring to the accompanying drawing wherein FIG. 1 gives a detailed description and diagrammatic illustration of a test cell 10. A carbon electrode 12 and opposed aluminum electrode 13 are positioned one from another in spaced relationship and maintained separated by a suitable separator 14. Carbon electrode 12, aluminum electrode 13 and the separator 14 are immersed in an electrolyte 11 held in a heat-resistant container 10. Carbon electrode 12 is fixed rigidly to a current carrier 15, and the aluminum electrode 13 is fixed rigidly to current carrier 16 and the current carriers 15 and 16 in turn are provided with leads 17 and 18 adapted to be connected either to a charging circuit or to a load of conventional design and construction. The container comprising the electrolyte and electrodes is purged of atmospheric air, and dry inert gas is introduced into the container. The open end of the container is then sealed with a cap 19 of inert material to prevent salt leakage and gas permeation.

EXAMPLE I

The test cell employed was similar to that shown in FIG. 1. The cell contained a cathode composed of porous carbon having a surface area of about 10 to 20 meters$^2$/gram, a volume of 0.013 inch$^3$, and a diameter of about 1 inch; an aluminum metal anode with a diameter of about 1 inch; and a separator composed of silica and alumina ceramic fiber. The tungsten current collector had a diameter of about 0.005 inch. The cell container was composed of lava and a gastight seal was provided. The cell was filled with an electrolyte having the molar composition of 60 percent aluminum chloride, 26 percent sodium chloride, and 14 percent potassium chloride, and the cell was heated to 132° C. at which temperature the electrolyte was in a fused state.

The cell was charged to 2.25 volts at constant voltage and discharged to 1.0 volt at a constant current of 5 milliamperes. After several cycles the cathode had a capacity of 1.4 ampere hours/inch$^3$.

EXAMPLE II

A cell similar to that described above, with the exception that the cathode consisted of pyrolytic graphite having a volume of 0.085 inch$^3$, was employed. After several cycles this cathode demonstrated a capacity of 1.6 ampere hours/inch$^3$ at a 20 milliampere discharge.

I claim:

1. A secondary electrical energy storage device comprising in combination:
   a. a container,
   b. an electrolyte in said container consisting of aluminum bromide in admixture with one or more of the halides of the alkali metals, and
   c. a pair of spaced electrodes comprising a carbon cathode and an aluminum anode immersed in said electrolyte, said device being operable above the melting point of the electrolyte.

2. The electrical energy storage device of claim 1 wherein the electrolyte comprises a mixture of from about 80 to 20 parts by weight of aluminum bromide and 20 to 80 parts by weight of one or more of the halides of the alkali metals.

3. The electrical energy storage device of claim 2 wherein the cathode is composed of porous carbon having a surface area in the range of from about 10 to 2,000 meters$^2$/gram.

4. The electrical energy storage device of claim 2 wherein the cathode is composed of pyrolytic graphite.

5. The electrical energy storage device of claim 3 wherein the electrolyte consists of a mixture of aluminum bromide, sodium chloride and potassium chloride.

6. The electrical energy storage device of claim 3 wherein the carbon cathode contains an electrochemically-formed tellurium-carbon complex.

7. A secondary electrical energy storage device comprising in combination:
   a. a container,
   b. an electrolyte in said container consisting essentially of a mixture of aluminum bromide, sodium chloride and potassium chloride, c. a pair of spaced electrodes consisting of a porous carbon cathode and an aluminum anode immersed in said electrolyte, d. an inert, nonconductive ion-permeable separator disposed between and separating said electrodes (c), said device being operable above the melting point of the electrolyte.

8. The electrical energy storage device of claim 6 wherein tellurium is present in the carbon cathode in amounts of from about 5 to 40 percent by weight, based on the weight of the carbon.

* * * * *